INVENTORS
JACOB K. BRIXIUS
JAMES P. RYAN

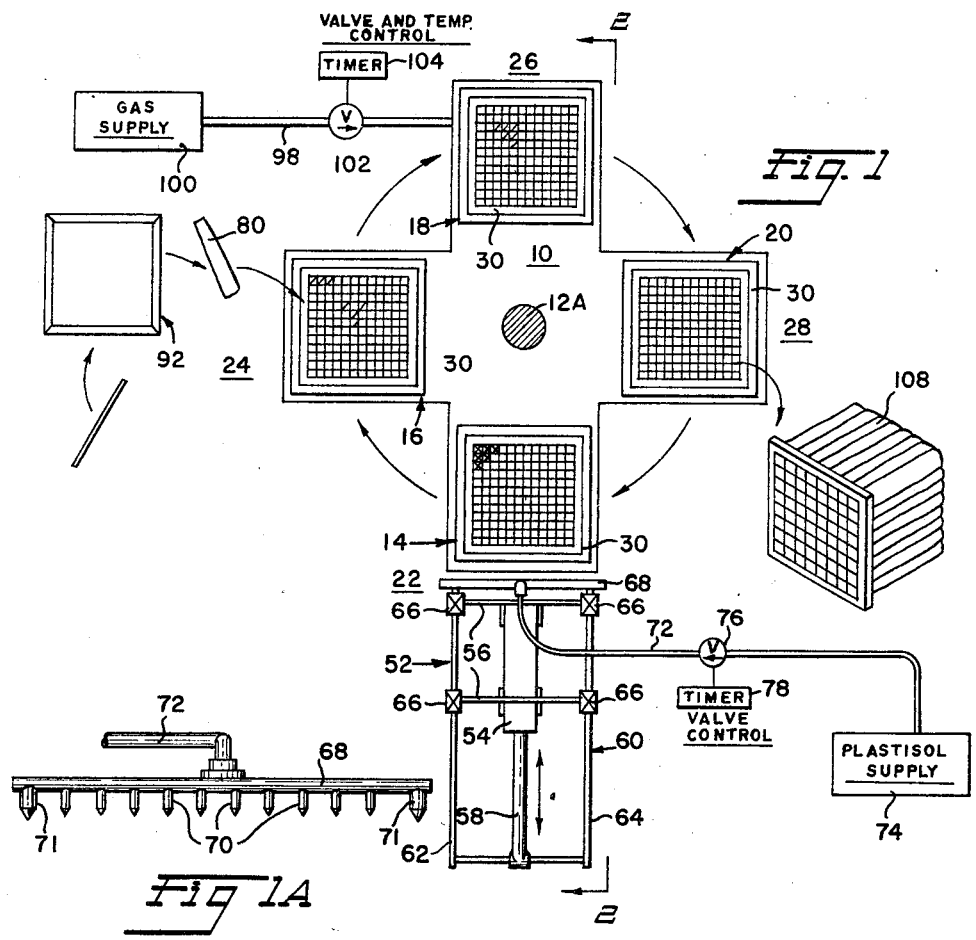
Fig. 1
Fig. 1A
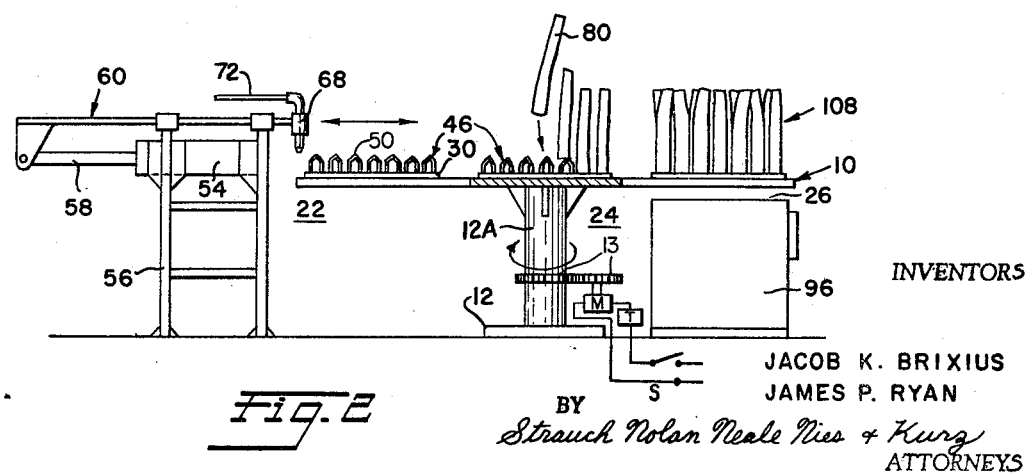
Fig. 2
INVENTORS
JACOB K. BRIXIUS
JAMES P. RYAN
BY Strauch Nolan Neale Nies & Kurz
ATTORNEYS March 17, 1970 J. K. BRIXIUS ET AL 3,501,563
METHOD FOR MAKING EXTENDED AREA TYPE FILTER ASSEMBLIES
Filed March 14, 1967 3 Sheets-Sheet 2
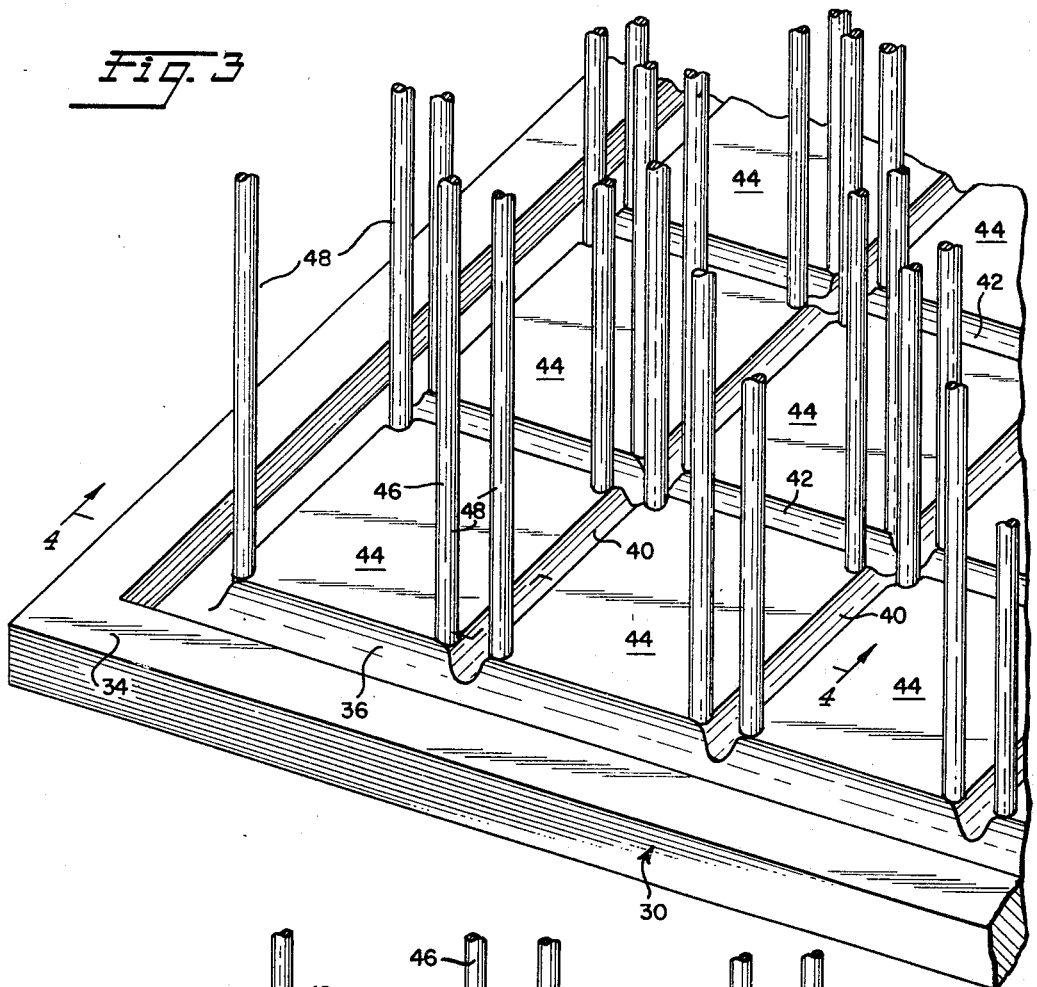
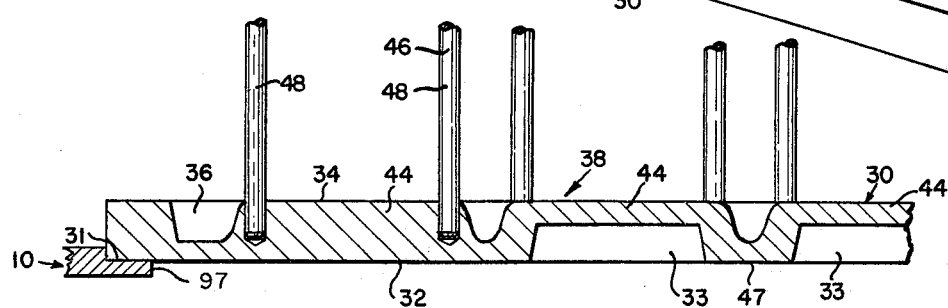
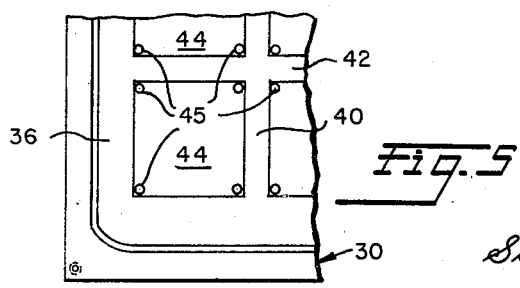
INVENTORS
JACOB K. BRIXIUS
JAMES P. RYAN
BY
Strauch Nolan Neale Nies + Kurz
ATTORNEYS

BY
Strauch Nolan Neale Nies + Kurz
ATTORNEYS

United States Patent Office 3,501,563
Patented Mar. 17, 1970

3,501,563
METHOD FOR MAKING EXTENDED AREA
TYPE FILTER ASSEMBLIES
Jacob K. Brixius, Parma, and James P. Ryan, Painesville, Ohio, assignors to North American Rockwell Corporation, a corporation of Delaware
Filed Mar. 14, 1967, Ser. No. 622,977
Int. Cl. B32b 31/06; B29c 6/04
U.S. Cl. 264—261                    2 Claims

ABSTRACT OF THE DISCLOSURE

The open ends of a plurality of elongated bag-like filter elements, known variously as pockets or socks, are imbedded and anchored within a molded grating-like panel in sealed association with the panel air admission apertures during the molding operation that forms the panel. A hollow rigid mounting frame is also bonded around the panel periphery during the molding operation. The method is carried out by an apparatus wherein molds are distributed around the periphery of a rotatable platform or table and successively indexed at stations where each mold in turn is supplied with liquid molding compound, the filter elements and mounting frame are placed on and in the mold, the assembly is integrally united as by heat curing the compound to solid state, and the completed filter assembly is unloaded from the platform.

RELATED APPLICATION

Ser. No. 618,613, filed Feb. 27, 1967 entitled Gas Filter Structure, which issued Jan. 21, 1969 as Letters Patent No. 3,422,602.

BACKGROUND OF INVENTION

Field of invention

This invention relates to a method for making extended area filters. Such filters comprise a front grating-like panel portion adapted for mounting in a wall or like opening and a plurality of relatively flexible elongated bag-like filter elements having their front open ends secured to the panel at the air admission apertures in the panel. During operation the pressure of the air or other gas being filtered inflates the filter elements so that they extend full length rearwardly of the panel. Filters of this general type are disclosed for example in U.S. Letters Patents to Rivers No. 2,853,154 and Hogg No. 3,124,440.

Prior art

The filter elements in prior art such as the foregoing patents were attached mechanically to the front panel structure. This involved complex structural devices such as clamps, fasteners, adhesive and supporting frames which were time-consuming and expensive to assemble, and since the resultant connection was usually not air tight special care had to be taken to seal all around the filter element mountings to prevent non-filtered air or gas from passing, this further increasing the labor and expense involved.

SUMMARY OF INVENTION

The invention provides a novel method wherein the front panel is formed and the filter elements anchored thereto in sealed relation preferably during panel formation. The panel is formed in a special mold structure adapted to dispose the open ends of the filter elements within a settable fluid plastic compound poured into the mold, and when the compound is cured or otherwise solidified to attain the desired panel structure the filter elements remain permanently anchored in sealed relation around the air admission openings provided by the mold in the panel. The plastic is preferably Plastisol which is readily heat cured in the mold.

The major object of the invention is to provide a novel method for making a unitary filter assembly of the extended area type wherein the open ends of the filter elements are simultaneously anchored and sealed within the panel structure.

Another object of the invention is to provide a novel method for making a unitary filter assembly of the extended area type wherein the forward panel is molded from a suitable plastic and the open ends of the individual filter elements are imbedded within the molded panel during the molding operation. Further to this object the panel is formed from a liquid compound wherein the open ends of the filter elements are imbedded and which is heat cured to solid state.

Further objects will be apparent from the disclosure of the preferred embodiments including the claims.

BRIEF DESCRIPTION OF DRAWINGS

FIGURE 1 is a relatively diagrammatic top plan view, partly in section, showing a preferred form of apparatus and illustrating the method according to a preferred embodiment of the invention;

FIGURE 1A is a fragmentary view showing enlarged and in elevation a dispensing head for the fluid molding material;

FIGURE 2 is a relatively diagrammatic partly sectioned side elevation as viewed substantially along line 2—2 in FIGURE 1 further illustrating the apparatus;

FIGURE 3 is an enlarged fragmentary perspective view partly broken away and sectioned showing the upper part of the mold and the filter element or sock supporting wire forms;

FIGURE 4 is a section substantially on line 4—4 in FIGURE 3;

FIGURE 5 is a fragmentary top plan view further showing the mold structure; and

PREFERRED EMBODIMENTS

Figure 6:
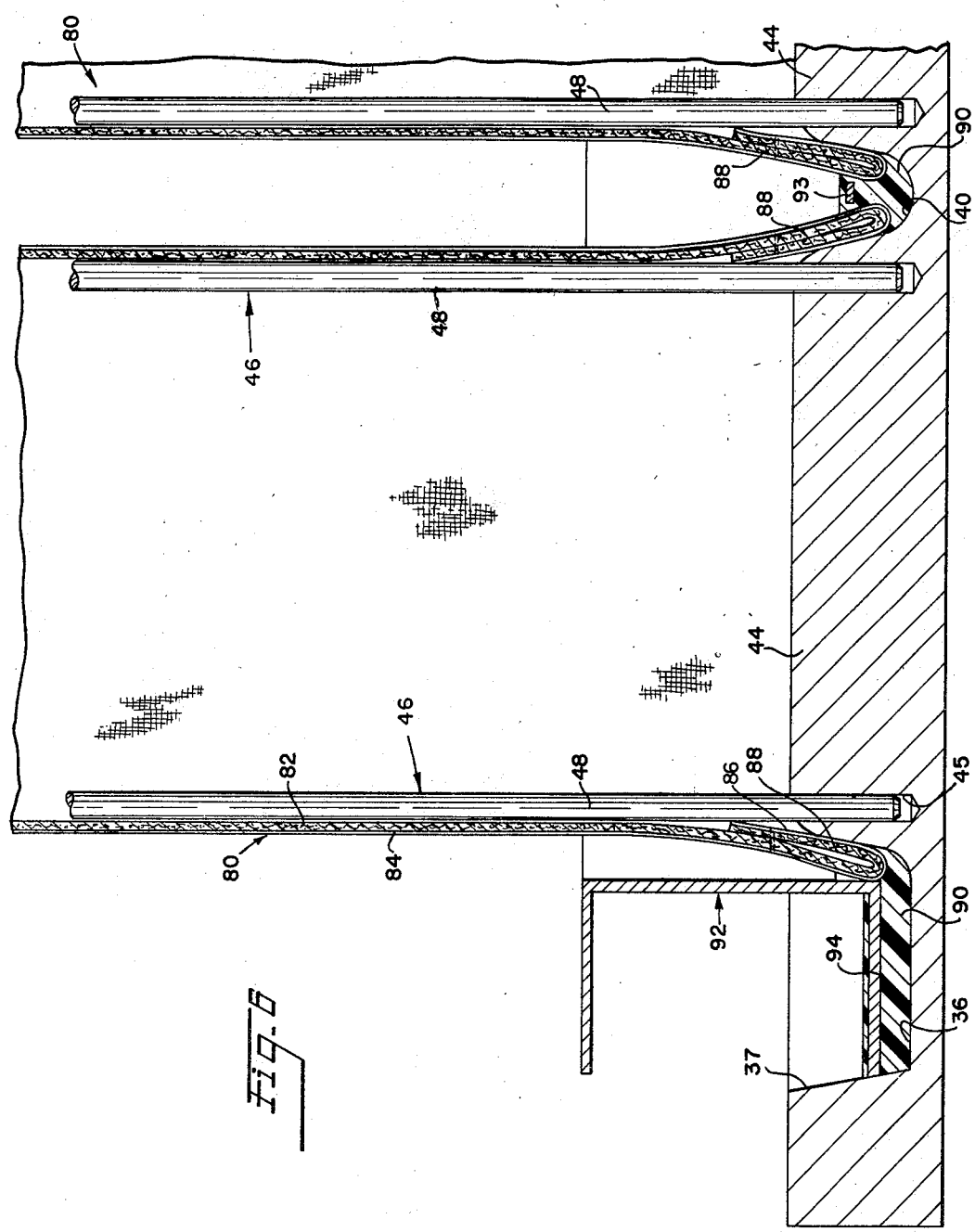
FIGURE 6 is an enlarged elevation in section showing the filter assembly components in the mold for illustration of the method.

FIGURE 1 shows the molding apparatus which comprises a rotary mold support table 10 carried by a vertical center column 12A suitably rotatably mounted on a floor plate 12. Suitable drive and control mechanism (not shown) is provided to rotate the column and index table 10 at appropriate 90° apart stations at timed intervals for the molding operation sequence.

Table 10 comprises four identical mold mounting and retaining sections 14, 16, 18 and 20 that are equally radially and circumferentially spaced around the table. Spaced around table 10 are a corresponding number of progressive work stations 22, 24, 26 and 28 one at each mold retaining section for progressive operations. The table is slowly rotated around its center column and stops for a time at each of the respective work stations, which may be defined as the mold filling station 22, loading station 24, curing station 26 and unloading station 28. Any suitable drive and control mechanism may be provided for the table. For example an operator controlled foot switch S could selectively close the circuit to a limit switch arrangement T for effecting each 90° advancement of the table by motor M. This may be done automatically and when switch S is closed, utilizing suitable control mechanism for this purpose such as the motor M controlled by timer mechanism T and connected to drive column 12A by the gearing indicated at 13 in FIGURE 1.

The table sections are each formed to mount an identical mold 30 conveniently held stationary thereon. Illustrated mold 30 is a rigid square metal plate. Referring to FIGURES 3–5, mold 30 has a generally flat bottom surface 32, the edges of which may seat in retainer recesses 31 in the table top. Mold 30 has a generally flat parallel top surface 34 formed with a marginal tapered outer side wall upwardly open groove 36 of uniform depth extending continuously all along its four sides at an equally spaced distance from the edges thereof and surrounding a central land portion 38.

Land portion 38 is criss-crossed by a series of longitudinal parallel surface grooves 40 intersecting at right angles. Grooves 40 and 42 are of uniform depth and have downwardly and inwardly tapered sides as shown in FIGURE 4, and they are equally spaced from each other with all of their ends opening into the surrounding marginal groove 36. This provides a large number of individual square equal area lands 44 within portion 38. The corners of lands 44 and the bottoms of grooves 40 and 42 are preferably rounded to eliminate sharp edges.

Socket apertures 45 are provided in each corner of each land 44 for mounting upright wire cage forms 46 that have their legs 48 thrust into the apertures. Legs 48 converge towards each other at their upper ends where they join to form rounded apexes 50 (FIG. 2). Upstanding cages 46 each have four legs 48, one fitting into the corresponding land aperture, and each cage 46 is adapted to support an individual filter sock on the mold 30 during the assembly operation. Grooves 36, 40 and 42 are adapted to be filled with a suitable amount of a settable plastic compound as will appear.

Mold 30 is preferably a solid aluminum plate to provide light weight and good heat conduction. Mold 30 is recessed at 33 beneath each individual land 44 as shown in FIGURE 4 to allow rapid efficient heat distribution upon heating of the mold during the curing operation to be described. It has further been found to be advantageous to polish areas 47 of bottom surface 32 which directly underlie grooves 36, 40 and 42, and to black anodize the entire bottom surface 32 including the surfaces within recesses 33 to obtain a more uniform heat pattern, so that the molding compound will be heated equally and to the same temperature throughout the mold.

Referring to FIGURES 1 and 2, the first work station 22 comprises a filling mechanism 52 adapted to fill the mold grooves 36, 40 and 42 with a semi-liquid molding compound. This mechanism comprises a fluid pressure cylinder 54 adjacent table 10 with its axis extending towards the center of the table. Cylinder 54 is suitably mounted on a support 56, and reciprocable push rod 58 from the cylinder is attached rearwardly of the support to a slide assembly 60 composed of parallel slide bars 62 and 64 supported intermediate their ends in pairs of fixed spaced bearings 66 on support 56.

Secured across the front ends of slide bars 62 and 64 is a nozzle manifold 68 that extends parallel to one set of cross grooves in mold 30 and is of a length sufficient to extend the width of mold 30. Nozzle manifold 68 carries a series of nozzles 70 (FIG. 1A) projecting downwardly therefrom, and these nozzles are suitably spaced to extend down between adjacent wire cages 46 to allow the nozzle manifold to travel across mold 30 during the filling operation to be described.

Manifold 68 is supplied with the molding compound through a flexible tube 72 connected to a supply tank 74. In order to control the amount of compound dispensed and the start and stop of the filling operation, a valve 76 is provided in conduit 72. Opening and closing of valve 76 is controlled by a conventional timing machanism 78 to open or close the valve in timed relation with the travel of the nozzle across the top of mold 30.

The mold filling operation is as follows:

Starting with the parts positioned as in FIGURE 1, actuation of cylinder 54 to displace push rod 58 in the direction of the table shifts nozzle 68 forwardly to position the filling nozzles 70 over the mold 30. At the outer edge of mold 30, forward travel of nozzle 68 is temporarily stopped for a short while and supply valve 76 is opened (control 78 being inter-locked with the control for cylinder 54) to start dispensing preheated semi-liquid molding compound directly into wide margin groove 36 at that edge. Travel of the nozzle is resumed after a predetermined short interval at a suitable speed with valve 76 remaining open all across the top of mold 30 for filling the criss-cross grooves 40 and 42 with the compound. For more efficient filling of the wider side marginal grooves 36, two larger diameter and nozzles 71 (FIG. 1A) may be provided. At the end of the travel across the mold 30, manifold 68 is stopped again for a predetermined short interval over wider end margin groove 36 before the return stroke of cylinder 54 starts.

Then supply of molding compound to the manifold 68 is stopped by timer 78 closing valve 76, and cylinder 54 is actuated in reverse until manifold 68 is returned to its initial start position of FIGURE 1. The molding compound is preferably dispensed only during the forward stroke of the manifold, usually in about one half of a minute, which provides sufficient time for the semi-liquid compound to level within all grooves 36, 40 and 42 before the table rotates to present the filled mold at the next work station 24.

While it is preferable as above described to stop movement of nozzle 68 when it is located over the wider groove sides 36, the mold filling operation could be accomplished in a single continuous displacement of the nozzle where the compound has such viscosity to spread quickly among the grooves.

A molding compound consisting of Plastisol having the following composition and properties has been found to accomplish excellent results in sealing and bonding the filter pockets to the filter frame according to the invention:

Base: polyvinyl chloride dispersed in a liquid plasticizer
Solids: 99% minimum at 200° F.
Viscosity: low (20 r.p.m. No. 4 spindle Brookfield)
Durometer: A-scale 72–78 at 80° F.
Gel point: 160–180° F.
Cure temperature: 350° to 400° F.
Cure time: 4 minutes
Shrinkage: 2.0% max.
Volatility: 2.0% max.
Tensile stress: 1200 p.s.i. minimum
Elongation: 300% minimum
Tear resistance: 275 lbs./in. minimum The foregoing plastisol compound is commercially available from the B. F. Goodrich Company under their Number 370x35094F. Other type plastisols and settable molding compounds, especially including those having equivalent properties may be used in the invention.

The foregoing molding compound has a good sealing property, is non-wicking, easily pourable and likewise easily releasable from the mold after curing, and is heat, light and ozone resistant. An added advantage of this compound, which is originally colorless, is the ability to add colorants which readily mix with the compound to allow coloring in various shades for easy identification of filters in various efficiency ranges.

After a mold 30 has been filled with molding compound at station 22, table 10 is automatically rotated to advance the filled mold to loading station 24, at which time table section 20 with an empty mold is advanced into the filling station 22.

At loading station 24, individual preformed open end filter elements in the form of socks or pockets 80 are threaded over wire cages 46, one sock over each cage, so as to be supported thereby and extend upwardly therefrom as shown at the right in FIGURE 2. As shown in FIGURE 6, each filter sock 80 may comprise a pliable filter media 82 such as glass wool or the like laminated to an outer back-up fabric sheet 84 such as scrim, buckram or the like. The media is folded and stitched, glued or heat sealed along one longitudinal and one short edge to provide an elongated sock open at one end as at 86. This filter structure is disclosed and claimed in the aforementioned Patent No. 3,422,602.

At station 24, the open ends 86 of socks 80 threaded over upright wire cages 46 are guided into the mold where the internal cuff or bead 88 surrounds a mold land 44 and projects into a mold groove to be partially immersed in the then liquid molding compound 90. As shown in FIGURE 6, the sides of adjacent sock end cuffs 88 extend into the same groove 40 (or 42) where they are flared toward each other by the taper of the groove side walls. The outer sides of the outer row of socks have their outer cuff sides disposed in the continuous groove 36 as shown in FIGURE 6. The peripheral dimensions of each land 44 are such that the sock ends are not permitted to bottom in any of the mold grooves, to insure that there will be an adequate amount of molding compound surrounding the sock end cuffs.

After the filter socks have been mounted on the mold, a rectangular open frame 92 of suitable size of fabricated sheet metal or like rigid material is placed in marginal groove 36, wherein the front frame surface 94 will likewise be immersed in the molding compound 90. as illustrated in FIGURE 6, the outer tapered side wall surface 37 of groove 36 limits the entry of frame 92 into that groove and prevents complete immersion of the frame 92 within the compound. Preferably the frame 92 seats on the groove wall with surface 94 substantially in the plane of the open ends 86 of the filter elements surrounded by the frame. Usually the frame displaces some of the compound within the groove but a small amount remains under the front surface 94.

Instead of the tapered side construction of marginal groove 36, appropriate spacers (not shown) may be provided to space the frame 92 from the bottom of the groove.

To improve the strength of the assembly, metal stiffening straps 93 may be placed in certain of the grooves 40 or 42 of a length sufficient to rigidly connect opposite inner sides of the frame 92 to thus lend rigidity to the assembly between the sides of the frame. These straps are located to be immersed in the molding compound as shown in FIGURE 6.

Upon insertion of the filter element ends, frame 92 and stiffening straps 93 into the mold grooves 36, 40 and 42, the compound level in the grooves rises around the filter cuffs preferably to a height of about ⅜ of an inch from the bottom of the mold grooves and in any event to a height necessary to provide a good sealed anchor between the filter element and panel in the final assembly. Some of the compound extends up between the cuffs and the associated lands 44. The thickness of the resultant layer of compound across the front frame surface 94 in an average filter assembly is preferably about ¼ of an inch.

After the filter socks 80, frame 92 and stiffening straps 93 have been so positioned in the mold grooves, table 10 is automatically rotated to advance the now loaded mold into curing station 26.

Curing station 26 comprises an indirect heater 96 (FIG. 2) which may be of the gas fired infrared burner radiant type beneath table 10 so that advance of the loaded table section into station 26 positions the table aperture 97 below each mold directly over the heater.

Gas is supplied to heater 96 by a pipe 98 from the main gas line or storage tank 100. Pipe 98 includes a valve 102 controlled by a suitable timing mechanism 104 that may also embody any known temperature control means to maintain the desired heating temperature. Timer 104 is preferably activated by triggers on the table that start it each time a new mold moves into station 26. The most efficient curing temperature for the Plastisol used is between 350° F. and 400° F. Actually, this type Plastisol starts to convert from a semi-liquid to a solid state upon reaching 350° F. but it is very sensitive to a rapid heat rise so that temperature curing time should be interrelated to obtain the desired result and a curing time of between 4 to 6 minutes has been found to be sufficient in practice.

After completion of the proper curing cycle, burner 96 is automatically shut off by timing device 104 which closes valve 102. The Plastisol has now been cured solid and it forms a unitary panel bonding the open ends of all socks 80 in fixed relation and to the frame 92. The groove arrangement in the mold 30 provides an apertured panel design with an effective seal around the adjoining ends at the socks at the panel air admission apertures. The solidification of the Plastisol forms the panel and anchors the socks and the frame 92 permanently to the panel, all in one operation.

After the curing operation, table 10 is rotated again to dispose the completed filter assembly in the unloading station 28.

After sufficient cooling off at unloading station 28, the completed molded unitary filter assembly 108 is removed from mold 30. Since, as table 10 is rotated through its cycle, a mold ready for appropriate operation is positioned at each station, the steps are substantially continuous and it has been found that each filter assembly time between start of the operation at station 22 and removal at station 26 is not more than 4–7 minutes. The removal of the filter assembly from the mold is facilitated by the shape of the mold grooves, the small amount of shrinkage of Plastisol and the properties of the material used for the mold which prevents sticking of the solidified Plastisol to the mold. Preferably, the mold grooves 36, 40 and 42 are coated with "Teflon" or like material to prevent sticking of the cured Plastisol to the mold.

After removal of the complete filter assembly 108 from the mold the socks 80 may be folded flat against the rear of frame 92 and suitably banded to provide a relatively flat narrow package for storage and shipping.

The filter assembly 108 provided by the foregoing method has tested out to have a clean air resistance of less than 1.0 inch of water, for instance as low as .49 inch of water, and the lower this value the longer the useful life of the filter.

Thus, the invention provides a novel method of making an extended area type filter assembly, using a novel semiautomatic apparatus which greatly reduces or entirely eliminates manual operations to assure a speedier and more economical operation to provide a highly efficient and effectively sealed filter assembly.

By the method of the invention the spacings between adjacent sock end openings can be considerably smaller than in known mechanically assembled filters of this type so that a larger number of socks can be assembled for a panel of any given area, substantially increasing the air intake capacity and allowing the filter socks to be of shorter length for the same total filter area than conventional types.

The method of assembly of the invention eliminates the need for separate sealing operations between the socks and the panel and provides streamlined flared pocket entrances 86 eliminating sharp corners to further reduce resistance and pressure drop to a minimum.

The present invention may be embodied in other forms without departing from the spirit and essential characteristic thereof, therefore, the present embodiment is considered in all respects as illustrative only and not restricting the scope of the invention.

What we claim and desire to secure by Letters Patent is:

1. In a method of making an extended area type filter assembly, the steps of providing a mold provided with intersecting criss-cross surface grooves and a continuous circumferential surface groove surrounding and intersecting all of said criss-cross grooves, filling said mold grooves with a flowable plastic compound to a predetermined level, thereafter placing individual flexible filter elements over said mold with open ends immersed in said compound within said grooves, placing a hollow mounting frame in said circumferential groove to be at least partly immersed in said plastic compound, curing said plastic compound to solid state to permanently unite all of said filter elements with said frame in a unitary assembly, and removing said unitary assembly from the mold.

2. In the method of making a unitary extended area pocket type filter assembly incorporating a permanently united front mounting panel having air admission openings, the steps comprising providing a mold having recesses located and sized to conform to the desired air admission openings in said panel, assembling a number of flexible filter pockets in relatively closely spaced side by side relationship with said pockets having open ends located substantially in a common plane and with said open ends of said filter pockets inserted into corresponding mold recesses and placing a relatively rigid frame around said pocket assembly such that the front surface of said frame is located within a mold recess adjacent the plane of said open ends of said pockets, introducing a flowable plastic compound into the mold recesses to immerse the filter pocket open ends and at least part of said frame and solidifying said compound to thereby form said apertured front mounting panel with said frame permanently incorporated and with the open ends of said pockets sealingly united with the panel around said air admission openings.

References Cited

UNITED STATES PATENTS 3,235,633  2/1966  Holloway et al.
2,962,121  11/1960  Wilber.

ROBERT F. WHITE, Primary Examiner

R. H. SHEAR, Assistant Examiner

U.S. Cl. X.R.
264—277